United States Patent Office 3,573,312
Patented Mar. 30, 1971

3,573,312
PIPERAZINE DERIVATIVES OF ADAMANTANE-1,3-DICARBOXYLIC ACID
Carl Peter Krimmel, Wauconda, Ill., assignor to
G. D. Searle & Co., Chicago, Ill.
No Drawing. Filed Oct. 9, 1968, Ser. No. 766,305
Int. Cl. C07d 51/70
U.S. Cl. 260—268                                              6 Claims

ABSTRACT OF THE DISCLOSURE

Amides of adamantane-1,3-dicarboxylic acid and adamantane-1,3-diacetic acid with N-substituted piperazines are described herein. The compounds are obtained by the reaction of the appropriate acid chloride with a mono-substituted piperazine. The compounds are useful as antiviral agents.

---

The present invention relates to a group of amide derivatives of adamantanedicarboxylic acids. More particularly, it relates to a group of compounds having the following general formula

wherein $n$ is a whole number between 0 and 4 inclusive; X is selected from the group consisting of O and S; and R is selected from the group consisting of lower alkyl and hydroxy lower alkyl.

The lower alkyl radicals referred to above contain up to 6 carbon atoms and can be exemplified by radicals such as methyl, ethyl, propyl, isopropyl, and butyl. The hydroxy lower alkyl radicals referred to above likewise contain up to 6 carbon atoms and further contain at least 2 carbon atoms separating the hydroxy group from the nitrogen of the piperazine ring. Examples of such hydroxy alkyl groups are 2-hydroxyethyl, 3-hydroxypropyl, 2-hydroxypropyl, and 4-hydroxybutyl.

The organic bases of this invention form pharmaceutically acceptable salts with a variety of inorganic and strong organic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, methyl benzenesulfonate, ethyl toluenesulfonate, ethylene chlorohydrin, propylene chlorohydrin, allyl bromide, methallyl bromide, and crotyl bromide.

The compounds of this invention are useful because of their pharmacological properties. In particular, these compounds are useful as anti-viral agents. This anti-viral activity is determined in viable eggs by a variation of known procedures. Nine- to eleven-day-old eggs are used in groups of 6, both for testing and for controls. Two groups of eggs are inoculated with a solution or suspension of test compound at the highest previously determined non-toxic dose via the allantoic cavity. The inoculated eggs are incubated for 1 hour at 35.3° C. Then, each egg in the first group is inoculated via the allantoic cavity with 0.1 ml. of a virus dilution estimated to contain approximately 10 EID$_{50}$ of type A influenza virus, strain PR-8; each egg in the second group is inoculated with 0.2 ml. of a virus dilution estimated to contain approximately 100 EID$_{50}$ of the above virus. The eggs are incubated at 35.3° C. for 28–32 hours and then chilled in the refrigerator for 3–24 hours. An aliquot of allantoic fluid is then removed from each egg and a portion of each aliquot is used at a 1:10 dilution to qualitatively test for the presence of virus hemagglutinin (HA) using a suspension of chicken erythrocytes. Pools are made of the positive aliquots of allantoic fluids from each of the two groups of 6 eggs; approximately equal volumes of each aliquot are used to prepare the pools. Each of the two pools are then quantitatively assayed for virus HA content using a chicken erythrocyte suspension.

The following control experiments (6 eggs per group) are also run:

(1) Uninoculated controls: Receive neither virus nor test compound.

(2) Compound toxicity control: The eggs are inoculated only with the compound at the test dose and examined for toxicity effects.

(3) Virus inoculated controls: Two groups of eggs are treated in the manner described in the preceding paragraph except that they receive only the virus at the indicated doses and no test compound. The incubated eggs are then assayed qualitatively and quantitatively for virus content.

(4) Control EID$_{50}$ titration: The virus stock is analyzed at a series of dilutions to determine the actual EID$_{50}$ content of the virus suspensions inoculated into the eggs.

1,1'-(1,3-adamantylenedicarbonyl)bis[4 - methylpiperazine] and 1,1'-(1,3-adamantylenedicarbonyl)bis[4-propylpiperazine] were tested in the above procedure at a dose of 10 mg. per egg and were found to possess antiviral activity.

The present compounds are also pepsin inhibitors and anti-ulcer agents. In addition, they possess antibacterial activity against *Diplococcus pneumoniae*, antialgal activity against *Chlorella vulgaris*, and anthelmintic activity against *Turbatrix aceti*. They also inhibit germination of seeds of Trifolium.

The compounds of the present invention are prepared from an acid halide of the formula

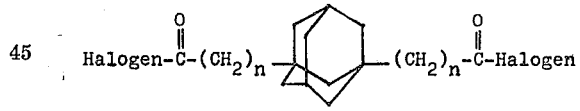

wherein $n$ is defined as above and halogen is preferably chlorine. The sulfur compounds are prepared by reaction of the appropriate amide with an agent such as phosphorus pentasulfide.

The following examples are presented to further illustrate the present invention; they should not be construed as limiting it in spirit or in scope. In these examples quantities by weight are indicated in grams, quantities by volume are indicated in milliliters, and temperatures are indicated in degrees centigrade (° C.).

EXAMPLE 1

A mixture of 4.5 grams of adamantane-1,3-dicarboxylic acid and 40 ml. of thionyl chloride is refluxed on a steam bath for 5 hours. Unreacted thionyl chloride is distilled from the mixture under reduced pressure on a steam bath. Azeotropically-dried benzene is added to the residue and distillation is resumed to remove traces of thinoyl chloride. The residual diacid chloride is dissolved in 60 ml. of azeotropically-dried benzene and to this solution is added, slowly with stirring, a solution of 4.0 grams of 1-methylpiperazine in 60 ml. of azeotropically-dried benzene. An exothermic reaction takes place and a thick gel forms.

The reaction mixture is then cooled to room temperature, the gel is separated by suction filtration, washed with anhydrous benzene and dried in a steam cabinet. The dried material is refluxed with 1900 ml. of absolute ethanol and the resulting solution is filtered hot to remove some insoluble material. The filtrate obtained is concentrated to a volume of about 700 ml. and cooled. A microcrystalline precipitate forms and is separated by filtration. 5.2 grams of this solid is dissolved in a refluxing solution of 700 ml. of absolute ethanol and 4.7 ml. of water. The hot solution is filtered and cooled and the precipitate which forms is separated by filtration and dried in a steam cabinet to give 1,1'-(1,3-adamantylenedicarbonyl)bis[4 - methylpiperazine] dihydrochloride dihydrate which melts with decomposition at about 318–324° C.

A solution is prepared from 13.7 grams of the dihydrochloride obtained in the preceding paragraph and 300 ml. of water. To this solution is added 30 grams of sodium hydroxide as a 50% aqueous solution. An emulsion forms and is extracted twice with 200-ml. portions of benzene. The benzene extracts are combined, dried over anhydrous sodium sulfate, and concentrated on a steam bath. A syrup forms first but on cooling this becomes a white granular crystalline solid. The material obtained in this way is 1,1'-(1,3-adamantylenedicarbonyl)bis[4-methylpiperazine] melting at about 171–177° C. This compound has the following formula

EXAMPLE 2

Adamantane-1,3-dicarbonyl chloride is prepared from 4.5 grams of adamantane-1,3-dicarboxylic acid and thionyl chloride according to the procedure described in Example 1. The resulting acid chloride is dissolved in 60 ml. of azeotropically-dried benzene and to this solution is added, slowly with stirring, a solution of 5.1 grams of 1-propylpiperazine in 100 ml. of benzene. An exothermic reaction takes place and a gel forms at first but then redissolves. The benzene solvent is removed by heating the mixture on a steam bath and the resulting residue is mixed with 60 ml. of anhydrous ethyl ether. A crystalline precipitate forms and is separated by filtration and dried. The solid is then dissolved in 100 ml. of warm acetone and the resulting solution is cooled, treated with charcoal, and filtered through diatomaceous earth. The filtrate is diluted with 400 ml. of anhydrous ether and seeded. A precipitate forms and is removed by filtration and the resulting filtrate is further diluted with 600 ml. of anhydrous ether. This mixture is filtered to remove some precipitate and the solvent is removed on a steam bath to leave a viscous liquid. This liquid, upon cooling, sets to a white crystalline solid. The solid is purified by comminuting it under 40 ml. of anhydrous ether and filtering immediately and then suspending the comminuted solid in 400 ml. of anhydrous ether and stirring for 15 minutes at room temperature. A small amount of material remains undissolved and is removed by filtration. The solvent is then evaporated from the filtrate under reduced pressure and the residue is dried to give 1,1'-(1,3-adamantylenedicarbonyl)bis[4-propylpiperazine] melting at about 144–148° C. This compound has the following formula

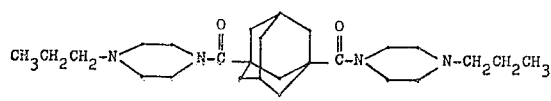

To a solution of 1.3 grams of the above amide in 100 ml. of anhydrous 2-propanol there is added, with stirring, 2.0 ml. of an anhydrous 2-propanol solution containing 0.26 gram of hydrogen chloride per milliliter of 2-propanol. A white precipitate forms and the resultant mixture is allowed to stand for 30 minutes with intermittent stirring. The solid is then separated by filtration and washed with anhydrous 2-propanol and dried to give 1,1'-(1,3 - adamantylenedicarbonyl)bis[4-propylpiperazine] dihydrochloride 2-propanolate melting at about 315–319° C. with decomposition.

EXAMPLE 3

Adamantane-1,3-diacetyl chloride is prepared from 10.0 grams of adamantane-1,3-diacetic acid and thionyl chloride according to the procedure described in Example 1 for the preparation of adamantane-1,3-dicarbonyl chloride. The acid chloride is dissolved in 100 ml. of azeotropically-dried benzene and to the solution there is added, slowly and with stirring, a solution of 8.0 grams of 1-methylpiperazine in 100 ml. of azeotropically-dried benzene. An exothermic reaction takes place and a gel separates. On stirring, the gel becomes a particulate slurry which is separated by filtration. The separated solid is dissolved in 200 ml. of water and sodium hydroxide solution is added until the mixture becomes strongly alkaline and an oil forms. The resulting mixture is then extracted twice with 150-ml. portions of benzene and the combined benzene extracts are dried over anhydrous sodium sulfate, treated with charcoal, and filtered. Evaporation of the solvent from the filtrate leaves a viscous syrup which is distilled to give a product boiling at about 262–265° C. at 0.1 mm. pressure. On standing, the distilled material crystallizes to give 1,1'-(1,3-adamantylenediacetyl)bis[4-methylpiperazine] melting at about 85–88° C. This compound has the following formula

EXAMPLE 4

A mixture of 2.0 grams of 1,1'-(1,3-adamantylenedicarbonyl)bis[4-methylpiperazine], 1.1 grams of phosphorus pentasulfide, and 30 ml. of anhydrous pyridine is refluxed for 2 hours. The mixture is then cooled and diluted with 400 ml. of cold water and it is stirred until the gummy material originally present becomes a powdery yellow solid. The solid is separated by filtration and stirred for 30 minutes with 500 ml. of cold water. It is again separated by filtration, dried and then stirred with 30 ml. of concentrated hydrochloric acid at room temperature. This mixture is filtered through diatomaceous earth and the filtrate is carefully diluted with 30 ml. of cold water and made alkaline by the addition of a 30% aqueous sodium hydroxide solution with cooling. The precipitate which forms is separated by filtration, washed with water and dried. The dried solid is extracted with about 10 ml. of chloroform at room temperature and filtered and the solvent is evaporated from the filtrate to leave a residual orange gum. This is comminuted under cold water and then filtered and finally dried for 3 hours at 45° C. The product obtained in this way is 1,1'-(1,3 - adamantylenedithiocarbonyl)bis[4 - methylpiperazine] melting at about 73–85° C. It has the following formula

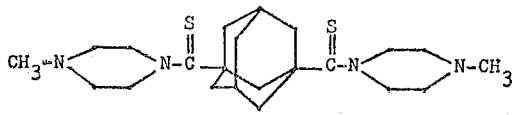

EXAMPLE 5

A solution of 1.6 grams of 1,1'-(1,3-adamantylenedicarbonyl)bis[4-methylpiperazine] in 40 ml. of 2-butanone is prepared by gently warming a mixture of the two materials. Then, 1.7 parts of ethyl bromide is added and the resultant mixture is allowed to stand in a stoppered flask for 24 hours. The precipitate which forms is removed by filtration and the filtrate is allowed to stand for an additional 24 hours in a stoppered flask. A new precipitate forms and this is separated by filtration and dried in a steam cabinet to give 1,1'-(1,3-adamantylenedicarbonyl)bis[4-methylpiperazine] ethobromide melting at about 234–240° C. This compound has the following formula

EXAMPLE 6

Adamantane-1,3-dicarbonyl chloride is prepared from 6.0 grams of adamantane-1,3-dicarboxylic acid and thionyl chloride according to the procedure described in Example 1. The acid chloride is dissolved in 100 ml. of azeotropically-dried benzene and this solution is added, slowly with stirring, to a solution of 7.0 grams of 1-(2-hydroxyethyl)piperazine in 100 ml. of azeotropically-dried benzene. The resultant mixture is cooled and extracted with two 50-ml. portions of water. The water extracts are combined and washed with 50 ml. of benzene and the water solution is then filtered through diatomaceous earth. The filtrate obtained is made strongly alkaline with sodium hydroxide and then saturated with sodium chloride. The resulting solution is extracted with benzene, the benzene extract is dried over sodium sulfate, and the benzene solvent is removed. The residue obtained is 1,1'-(1,3 - adamantylenedicarbonyl)bis[4-(2-hydroxyethyl)piperazine]. To 1.3 grams of this amine dissolved in 60 ml. of 2-butanone is added 1.0 ml. of an anhydrous 2-propanol solution containing 0.26 gram of hydrogen chloride per milliliter of 2-propanol. A pale yellow precipitate forms. This is separated by filtration, washed with 30 ml. of 2-butanone, and dried in an air current. The material first becomes watery but on further standing solidifies to a microcrystalline powder which is stable to air and melts at about 226–252° C. The product obtained in this way is 1,1'-(1,3-adamantylenedicarbonyl)bis[4-(2-hydroxyethyl)piperazine] dihydrochloride dihydrate. The free base of this compound has the following formula

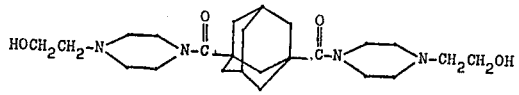

What is claimed is:
1. A compound of the formula

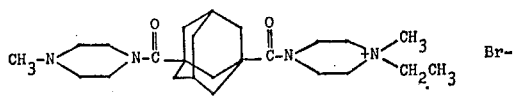

wherein $n$ is 0 or 1; X is selected from the group consisting of O and S; and R is selected from the group consisting of lower alkyl and hydroxyethyl.

2. A compound according to claim 1 which has the formula

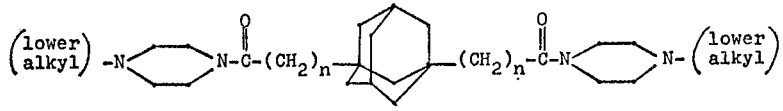

wherein $n$ is 0 or 1.

3. A compound according to claim 1 which has the formula

4. A compound according to claim 1 wherein $n$ is 0, X is O, and R is methyl, said compound being 1,1'-(1,3-adamantylenedicarbonyl)bis[4-methylpiperazine].

5. A compound according to claim 1 wherein $n$ is 0, X is O, and R is propyl, said compound being 1,1'-(1,3-adamantylenedicarbonyl)bis[4-propylpiperazine].

6. A compound according to claim 1 wherein $n$ is 1, X is O, and R is methyl, said compound being 1,1'-(1,3-adamantylenediacetyl)bis[4-methylpiperazine].

References Cited

UNITED STATES PATENTS 3,300,480    1/1967    Narayanan _____ 260—239

FOREIGN PATENTS 1,353,906    2/1964    France.

DONALD G. DAUS, Primary Examiner

U.S. Cl. X.R.

260—514, 544; 424—258